United States Patent
Un et al.

(10) Patent No.: US 10,515,655 B2
(45) Date of Patent: *Dec. 24, 2019

(54) EMOTION TYPE CLASSIFICATION FOR INTERACTIVE DIALOG SYSTEM

(71) Applicant: Microsoft Technology Licensing, LLC, Redmond, WA (US)

(72) Inventors: Edward Un, Beijing (CN); Max Leung, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,863

(22) Filed: Sep. 4, 2017

(65) Prior Publication Data

US 2018/0005646 A1 Jan. 4, 2018

Related U.S. Application Data

(63) Continuation of application No. 14/561,190, filed on Dec. 4, 2014, now Pat. No. 9,786,299.

(51) Int. Cl.
*G10L 13/08* (2013.01)
*G10L 13/00* (2006.01)
(Continued)

(52) U.S. Cl.
CPC ........ *G10L 25/63* (2013.01); *G06F 16/90332* (2019.01); *G06F 17/2785* (2013.01); *G10L 13/033* (2013.01); *G10L 13/08* (2013.01)

(58) Field of Classification Search
None
See application file for complete search history.

(56) References Cited

U.S. PATENT DOCUMENTS

| | | |
|---|---|---|
| 6,144,938 A | 11/2000 | Surace et al. |
| 6,151,571 A | 11/2000 | Pertrushin |

(Continued)

FOREIGN PATENT DOCUMENTS

| | | |
|---|---|---|
| CN | 1643575 A | 7/2005 |
| CN | 101030368 A | 9/2007 |

(Continued)

OTHER PUBLICATIONS

Wagner, Johannes, "EmoVoice—Real-Time Emotion Recognition from Speech", Retrieved From: http://www.informatik.uni-augsburg.de/en/chairs/hcm/projects/tools/emovoice/, Jan. 1, 2005, 4 Pages.

(Continued)

*Primary Examiner* — Satwant K Singh

(57) ABSTRACT

Techniques for selecting an emotion type code associated with semantic content in an interactive dialog system. In an aspect, fact or profile inputs are provided to an emotion classification algorithm, which selects an emotion type based on the specific combination of fact or profile inputs. The emotion classification algorithm may be rules-based or derived from machine learning. A previous user input may be further specified as input to the emotion classification algorithm. The techniques are especially applicable in mobile communications devices such as smartphones, wherein the fact or profile inputs may be derived from usage of the diverse function set of the device, including online access, text or voice communications, scheduling functions, etc.

21 Claims, 11 Drawing Sheets

(51) Int. Cl.
  *G10L 21/00* (2013.01)
  *G10L 25/63* (2013.01)
  *G06F 16/9032* (2019.01)
  *G06F 17/27* (2006.01)
  *G10L 13/033* (2013.01)

(56) References Cited

U.S. PATENT DOCUMENTS

| | | | |
|---|---|---|---|
| 6,598,020 | B1 | 7/2003 | Kleindienst et al. |
| 6,754,560 | B2 | 6/2004 | Fujita et al. |
| 6,757,362 | B1 | 6/2004 | Cooper et al. |
| 7,233,900 | B2 | 6/2007 | Kariya |
| 7,340,393 | B2 | 3/2008 | Mitsuyoshi |
| 7,451,079 | B2 | 11/2008 | Oudeyer |
| 7,627,475 | B2 | 12/2009 | Petrushin |
| 7,944,448 | B2 | 5/2011 | Iwamura et al. |
| 7,983,910 | B2 * | 7/2011 | Subramanian ...... G10L 19/0018 704/250 |
| 8,386,265 | B2 * | 2/2013 | Subramanian ...... G10L 19/0018 704/2 |
| 8,626,489 | B2 * | 1/2014 | Lee .................. G06F 17/27 704/10 |
| 9,564,149 | B2 | 2/2017 | Gelfenbeyn et al. |
| 9,641,563 | B1 | 5/2017 | Kitada et al. |
| 9,786,299 | B2 * | 10/2017 | Un ................... G10L 13/08 |
| 2002/0029203 | A1 | 3/2002 | Pelland et al. |
| 2003/0028383 | A1 | 2/2003 | Guerin et al. |
| 2003/0093280 | A1 | 5/2003 | Oudeyer |
| 2003/0167167 | A1 | 9/2003 | Gong |
| 2007/0208569 | A1 | 9/2007 | Subramanian et al. |
| 2008/0096533 | A1 | 4/2008 | Manfredi et al. |
| 2014/0343947 | A1 | 11/2014 | Winter et al. |
| 2015/0071068 | A1 | 3/2015 | Gupta |
| 2015/0199967 | A1 * | 7/2015 | Reddy ................ G10L 25/30 704/249 |
| 2016/0071510 | A1 * | 3/2016 | Li .................... G10L 13/027 704/260 |

FOREIGN PATENT DOCUMENTS

| | | |
|---|---|---|
| CN | 101474481 A | 7/2009 |
| CN | 103198827 A | 7/2013 |
| EP | 1038291 B1 | 2/2007 |
| JP | 2000004485 A | 1/2000 |
| JP | 200207214 A | 7/2000 |
| JP | 2014204429 A | 10/2014 |
| RU | 2012137028 A | 3/2014 |
| RU | 2530267 C2 | 10/2014 |
| WO | 3073417 A2 | 9/2003 |
| WO | 2014113889 A1 | 7/2014 |

OTHER PUBLICATIONS

"Second Written Opinion Issued in PCT Application No. PCT/US2015/063301", dated Nov. 11, 2016, 5 Pages.

"Final Office Action Issued in U.S. Appl. No. 14/561,190", dated Feb. 23, 2017, 12 Pages.

"Non-Final Office Action Issued in U.S. Appl. No. 14/561,190", dated Sep. 22, 2016, 10 Pages.

"Notice of Allowance Issued in U.S. Appl. No. 14/561,190", dated Jun. 7, 2017, 9 Pages.

Baldassarri, et al., "Emotional Speech Synthesis in Spanish for Natural Interaction", In Proceedings of New Trends on Human Computer Interaction—Research, Development, New Tools and Methods, Jan. 1, 2009, pp. 151-160.

Hjalmarsson, Anna, "Utterance Generation in Spoken Dialogue Systems", Retrieved From: https://web.archive.org/web/20140529111710/http://www.ida.liu.se/labs/nlplab/gslt/dsvt06/AnnaHj5.pdf,May 29, 2014, 24 Pages.

"International Preliminary Report on Patentability Issued in PCT Application No. PCT/US2015/063301", dated Feb. 21, 2017, 8 Pages.

"International Search Report and Written Opinion Issued in PCT Application No. PCT/US2015/063301", dated Feb. 26, 2016, 12 Pages.

"Office Action Issued in Russian Patent Application No. 2017119007", dated Jun. 19, 2019, 6 Pages. (w/o Translation).

"First Office Action and Search Report Issued in Chinese Patent Application No. 201580065944.X", dated Sep. 4, 2019, 23 Pages.

"Office Action Issued in Japanese Patent Application No. 2017-528786", dated Sep. 13, 2019, 8 Pages.

"Notice of Allowance Issued in Russian Patent Application No. 2017119007", dated Sep. 11, 2019, 18 Pages.

* cited by examiner

EMOTION TYPE CLASSIFICATION FOR INTERACTIVE DIALOG SYSTEM

BACKGROUND

Background

Artificial interactive dialog systems are an increasingly widespread feature in state-of-the-art consumer electronic devices. For example, modern wireless smartphones incorporate speech recognition, interactive dialog, and speech synthesis software to engage in real-time interactive conversation with a user to deliver such services as information and news, remote device configuration and programming, conversational rapport, etc.

To allow the user to experience a more natural and seamless conversation with the dialog system, it is desirable to generate speech or other output having emotional content in addition to semantic content. For example, when delivering news, scheduling tasks, or otherwise interacting with the user, it would be desirable to impart emotional characteristics to the synthesized speech and/or other output to more effectively engage the user in conversation.

Accordingly, it is desirable to provide techniques for determining suitable emotions to impart to semantic content delivered by an interactive dialog system, and classifying such determined emotions according to one of a plurality of predetermined emotion types.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for providing an apparatus for an interactive dialog system. In an aspect, fact or profile inputs available to a mobile communications device may be combined with previous or current user input to select an appropriate emotion type code to associate with an output statement generated by the interactive dialog system. The fact or profile inputs may be derived from certain aspects of the device usage, e.g., user online activity, user communications, calendar and scheduling functions, etc. The algorithms for selecting the emotion type code may be rules-based, or pre-configured using machine learning techniques. The emotion type code may be combined with the output statement to generate synthesized speech having emotional characteristics for an improved user experience.

Other advantages may become apparent from the following detailed description and drawings.

DETAILED DESCRIPTION

Various aspects of the technology described herein are generally directed towards a technology for selecting an emotion type code associated with an output statement in an electronic interactive dialog system. The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
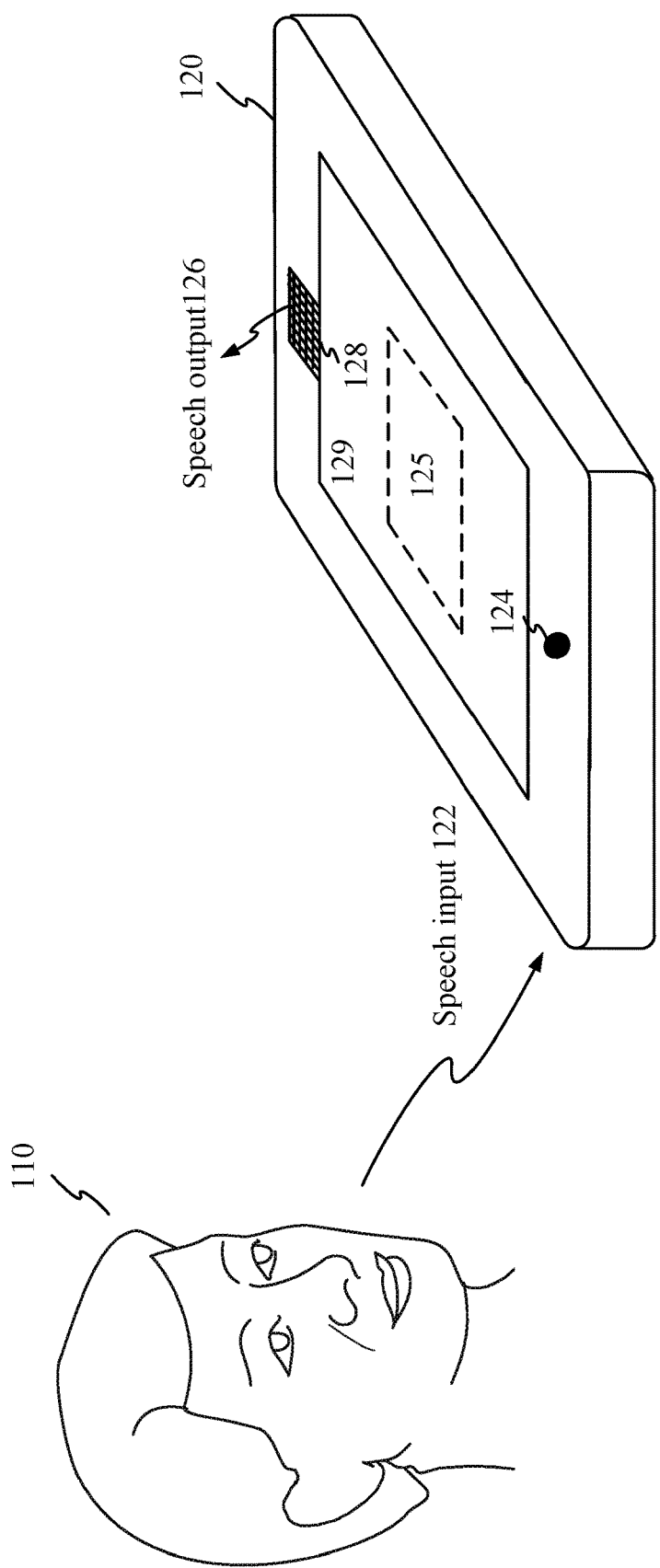
FIG. 1 illustrates a scenario employing a mobile communications device wherein techniques of the present disclosure may be applied.

FIG. 1 illustrates a scenario employing a mobile communications device 120 wherein techniques of the present disclosure may be applied. Note FIG. 1 is shown for illustrative purposes only, and is not meant to limit the scope of the present disclosure to only applications of the present disclosure to mobile communications devices. For example, techniques described herein may readily be applied in other devices and systems, e.g., in the human interface systems of notebook and desktop computers, automobile navigation systems, etc. Such alternative applications are contemplated to be within the scope of the present disclosure.

In FIG. 1, user 110 communicates with mobile communications device 120, e.g., a handheld smartphone. A smartphone may be understood to include any mobile device integrating communications functions such as voice calling and Internet access with a relatively sophisticated microprocessor for implementing a diverse array of computational tasks. User 110 may provide speech input 122 to microphone 124 on device 120. One or more processors 125 within device 120, and/or processors (not shown) available over a network (e.g., implementing a cloud computing scheme)

may process the speech signal received by microphone 124, e.g., performing functions as further described with reference to FIG. 2 hereinbelow. Note processor 125 need not have any particular form, shape, or functional partitioning such as described herein for exemplary purposes only, and such processors may generally be implemented using a variety of techniques known in the art.

Based on processing performed by processor 125, device 120 may generate speech output 126 responsive to speech input 122 using audio speaker 128. In certain scenarios, device 120 may also generate speech output 126 independently of speech input 122, e.g., device 120 may autonomously provide alerts or relay messages from other users (not shown) to user 110 in the form of speech output 126. In an exemplary embodiment, output responsive to speech input 122 may also be displayed on display 129 of device 120, e.g., as text, graphics, animation, etc.

Figure 2:
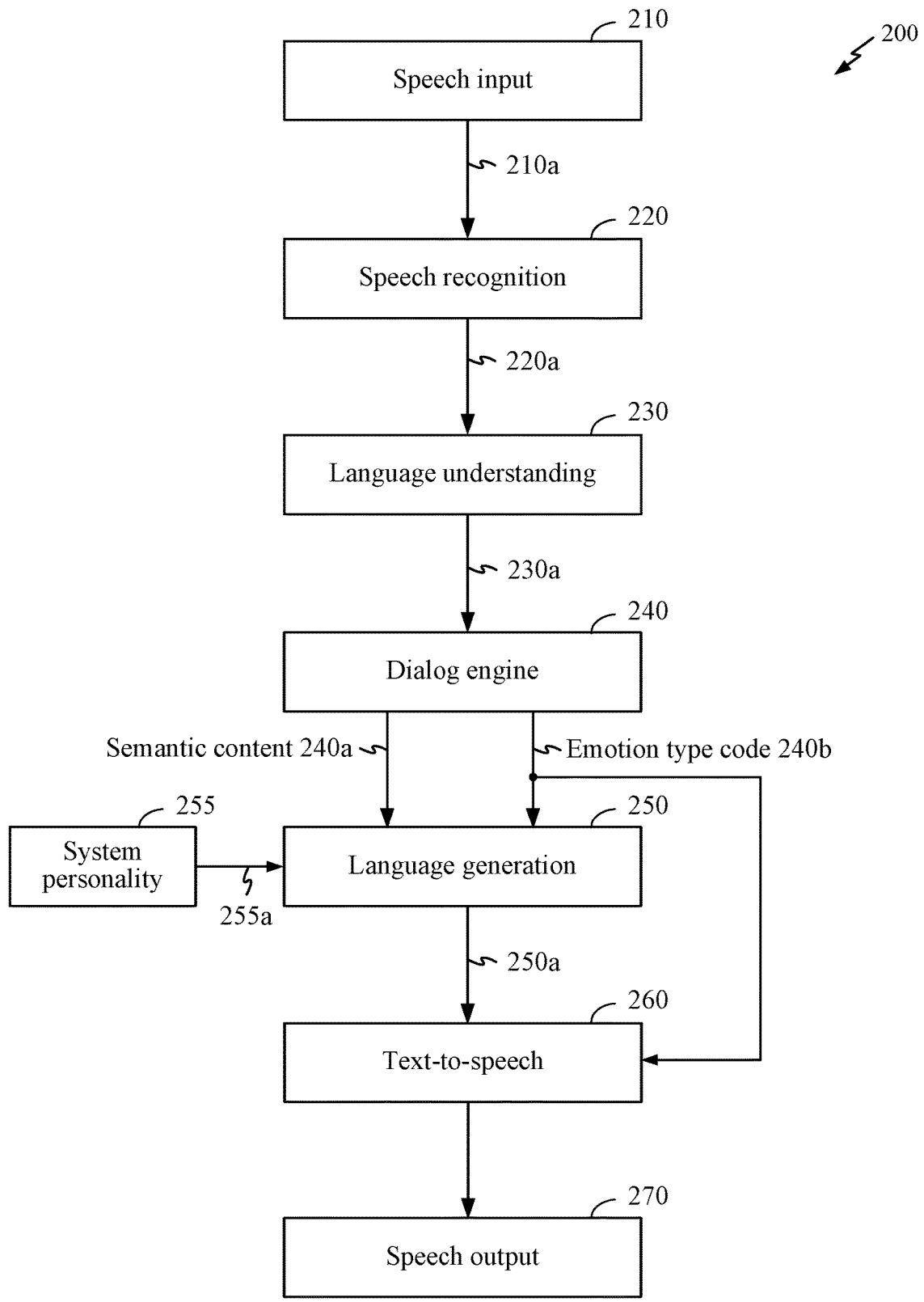
FIG. 2 illustrates an exemplary embodiment of processing that may be performed by processor and other elements of device.

FIG. 2 illustrates an exemplary embodiment of an interactive dialog system 200 that may be implemented by processor 125 and other elements of device 120. Note the processing shown in FIG. 2 is for illustrative purposes only, and is not meant to restrict the scope of the present disclosure to any particular sequence or set of operations shown in FIG. 2. For example, in alternative exemplary embodiments, certain techniques disclosed herein for selecting an emotion type code may be applied independently of the processing shown in FIG. 2. Furthermore, one or more blocks shown in FIG. 2 may be combined or omitted depending on specific functional partitioning in the system, and therefore FIG. 2 is not meant to suggest any functional dependence or independence of the blocks shown. Such alternative exemplary embodiments are contemplated to be within the scope of the present disclosure.

In FIG. 2, at block 210, speech input is received. Speech input 210 may correspond to a waveform representation of an acoustic signal derived from, e.g., microphone 124 on device 120. The output 210a of speech input 210 may correspond to a digitized version of the acoustic waveform containing speech content.

At block 220, speech recognition is performed on output 210a. In an exemplary embodiment, speech recognition 220 translates speech such as present in output 210a into text. The output 220a of speech recognition 220 may accordingly correspond to a textual representation of speech present in the digitized acoustic waveform output 210a. For example, if output 210a includes an audio waveform representation of a human utterance such as "What is the weather tomorrow?" e.g., as picked up by microphone 124, then speech recognition 220 may output ASCII text (or other text representation) corresponding to the text "What is the weather tomorrow?" based on its speech recognition capabilities. Speech recognition as performed by block 220 may be performed using acoustic modeling and language modeling techniques including, e.g., Hidden Markov Models (HMM's), neural networks, etc.

At block 230, language understanding is performed on the output 220a of speech recognition 220, based on knowledge of the expected natural language of output 210a. In an exemplary embodiment, natural language understanding techniques such as parsing and grammatical analysis may be performed using knowledge of, e.g., morphology and syntax, to derive the intended meaning of the text in output 220a. The output 230a of language understanding 230 may include a formal representation of the semantic and/or emotional content of the speech present in output 220a.

At block 240, a dialog engine generates a suitable response to the speech as determined from output 230a. For example, if language understanding 230 determines that the user speech input corresponds to a query regarding the weather for a particular geography, then dialog engine 240 may obtain and assemble the requisite weather information from sources, e.g., a weather forecast service or database. For example, retrieved weather information may correspond to time/date code for the weather forecast, a weather type code corresponding to "sunny" weather, and a temperature field indicating an average temperature of 72 degrees.

In an exemplary embodiment, dialog engine 240 may further "package" the retrieved information so that it may be presented for ready comprehension by the user. Accordingly, the semantic content output 240a of dialog engine 240 may correspond to a representation of the semantic content such as "today's weather sunny; temperature 72 degrees."

In addition to semantic content 240a, dialog engine 240 may further generate an emotion type code 240b associated with semantic content 240a. Emotion type code 240b may indicate a specific type of emotional content to impart to semantic content 240a when delivered to the user as output speech. For example, if the user is planning to picnic on a certain day, then a sunny weather forecast may be simultaneously delivered with an emotionally upbeat tone of voice. In this case, emotion type code 240b may refer to an emotional content type corresponding to "moderate happiness." Techniques for generating the emotion type code 240b based on data, facts, and inputs available to the interactive dialog system 200 will be further described hereinbelow, e.g., with reference to FIG. 3.

At block 250, language generation is performed on the outputs 240a, 240b of dialog engine 240. Language generation presents the output of dialog engine 240 in a natural language format, e.g., as sentences in a target language obeying lexical and grammatical rules, for ready comprehension by a human user. For example, based on the semantic content 240a, language generation 250 may generate the following statement: "The weather today will be 72 degrees and sunny."

In an exemplary embodiment, block 250 may further accept input 255a from system personality block 255. System personality block 255 may specify default parameters 255a for the dialog engine according to a pre-selected "personality" for the interactive dialog system. For example, if the system personality is chosen to be "male" or "female," or "cheerful" or "thoughtful," then block 255 may specify parameters corresponding to the system personality as reference input 255a. Note in certain exemplary embodiments, block 255 may be omitted, or its functionality may be incorporated in other blocks, e.g., dialog engine 240 or language generation block 250, and such alternative exemplary embodiments are contemplated to be within the scope of the present disclosure.

In an exemplary embodiment, language generation block 250 may combine semantic content 240a, emotion type code 240b, and default emotional parameters 255a to synthesize an output statement 250a. For example, an emotion type code 240b corresponding to "moderate happiness" may cause block 250 to generate a natural language (e.g., English) sentence such as "Great news—the weather today will be 72 degrees and sunny!" Output statement 250a of language generation block 250 is provided to the subsequent text-to-speech block 260 to generate audio speech corresponding to the output statement 250a.

Note in certain exemplary embodiments, some functionality of the language generation block 250 described hereinabove may be omitted. For example, language generation block 250 need not specifically account for emotion type code 240*b* in generating output statement 250*a*, and text-to-speech block 260 (which also has access to emotion type code 240*b*) may instead be relied upon to provide the full emotional content of the synthesized speech output. Furthermore, in certain instances where information retrieved by dialog engine is already in a natural language format, then language generation block 250 may effectively be bypassed. For example, an Internet weather service accessed by dialog engine 240 may provide weather updates directly in a natural language such as English, so that language generation 250 may not need to do any substantial post-processing on the semantic content 240*a*. Such alternative exemplary embodiments are contemplated to be within the scope of the present disclosure.

At block 260, text-to-speech conversion is performed on output 250*a* of language generation 250. In an exemplary embodiment, emotion type code 240*b* is also provided to TTS block 260 to synthesize speech having text content corresponding to 250*a* and emotional content corresponding to emotion type code 240*b*. The output of text-to-speech conversion 260 may be an audio waveform.

At block 270, an acoustic output is generated from the output of text-to-speech conversion 260. The speech output may be provided to a listener, e.g., user 110 in FIG. 1, by speaker 128 of device 120.

As interactive dialog systems become increasingly sophisticated, it would be desirable to provide techniques for effectively selecting suitable emotion type codes for speech and other types of output generated by such systems. For example, as suggested by the provision of emotion type code 240*b* along with semantic content 240*a*, in certain applications it is desirable for speech output 270 to be generated not only as an emotionally neutral rendition of text, but also to incorporate a pre-specified emotional content when delivered to the listener. Thus the output statement 250*a* may be associated with a suitable emotion type code 240*b* such that user 110 will perceive an appropriate emotional content to be present in speech output 270.

For example, if dialog engine 240 specifies that semantic content 240*a* corresponds to information that a certain baseball team has won the World Series, and user 110 is further a fan of that baseball team, then choosing emotion type code 240*b* to represent "excited" (as opposed to, e.g., neutral or unhappy) to match the user's emotional state would likely result in a more satisfying interactive experience for user 110.

Figure 3:
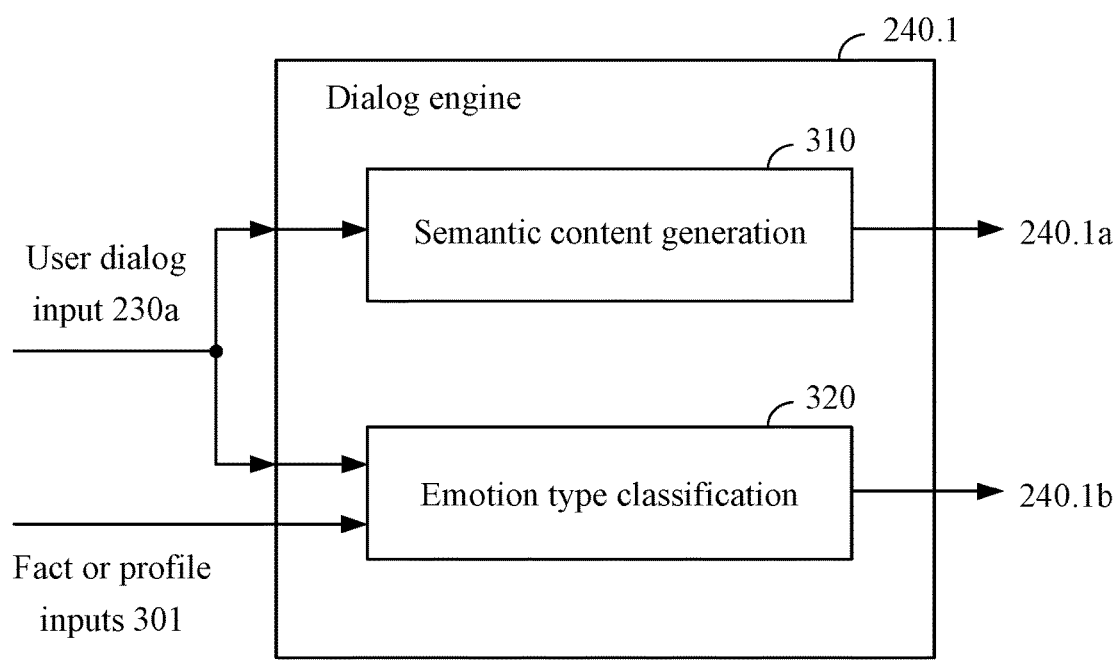
FIG. 3 illustrates an exemplary embodiment of processing performed by a dialog engine.

FIG. 3 illustrates an exemplary embodiment 240.1 of processing performed by dialog engine 240 to generate appropriate semantic content as well as an associated emotion type code. Note FIG. 3 is shown for illustrative purposes only, and is not meant to limit the scope of the present disclosure to any particular application of the techniques described herein.

In FIG. 3, dialog engine 240.1 includes semantic content generation block 310 and an emotion type classification block 320, also referred to herein as a "classification block." Both blocks 310 and 320 are provided with user dialog input 230*a*, which may include the output of language understanding 230 performed on one or more statements or queries by user 110 in the current or any previous dialog session. In particular, semantic content generation block 310 generates semantic content 240.1*a* corresponding to information to be delivered to user, while emotion type classification block 320 generates an appropriate emotion type, represented by emotion type code 240.1*b*, to be imparted to semantic content 240.1*a*. Note user dialog input 230*a* may be understood to include any or all of user inputs from current or previous dialog sessions, e.g., as stored in history files on a local device memory, etc.

In addition to user dialog input 230*a*, block 320 is further provided with "fact or profile" inputs 301, which may include parameters derived from usage of the device on which the dialog engine 240.1 is implemented. Emotion type classification block 320 may generate the appropriate emotion type code 240.1*b* based on the combination of fact or profile inputs 301 and user dialog input 230*a* according to one or more algorithms, e.g., with parameters trained off-line according to machine learning techniques further disclosed hereinbelow. In an exemplary embodiment, emotion type code 240.1*b* may include a specification of both the emotion (e.g., "happy," etc.) as well as a degree indicator indicating the degree to which that emotion is exhibited (e.g., a number from 1-5, with 5 indicating "very happy"). In an exemplary embodiment, emotion type code 240.1*b* may be expressed in a format such as specified in an Emotion Markup Language (EmotionML) for specifying one of a plurality of predetermined emotion types that may be imparted to the output speech.

It is noted that a current trend is for modern consumer devices such as smartphones to increasingly take on the role of indispensable personal assistants, integrating diverse feature sets into a single mobile device carried by the user frequently, and often continuously. The repeated use of such a device by a single user for a wide variety of purposes (e.g., voice communications, Internet access, schedule planning, recreation, etc.) allows potential access by interactive dialog system 200 to a great deal of relevant data for selecting emotion type code 240.1*b*. For example, if location services are enabled for a smartphone, then data regarding the user's geographical locale over a period of time may be used to infer certain of the user's geographical preferences, e.g., being a fan of a local sports team, or propensity for trying new restaurants in a certain area, etc. Other examples of usage scenarios generating relevant data include, but are not limited to, accessing the Internet using a smartphone to perform topic or keyword searches, scheduling calendar dates or appointments, setting up user profiles during device initialization, etc. Such data may be collectively utilized by a dialog system to assess an appropriate emotion type code 240.1*b* to impart to semantic content 240.1*a* during an interactive dialog session with user 110. In view of such usage scenarios, it is especially advantageous to derive at least one or even multiple fact or profile input 301 from the usage of a mobile communications device implementing the interactive dialog system.

Figure 4:
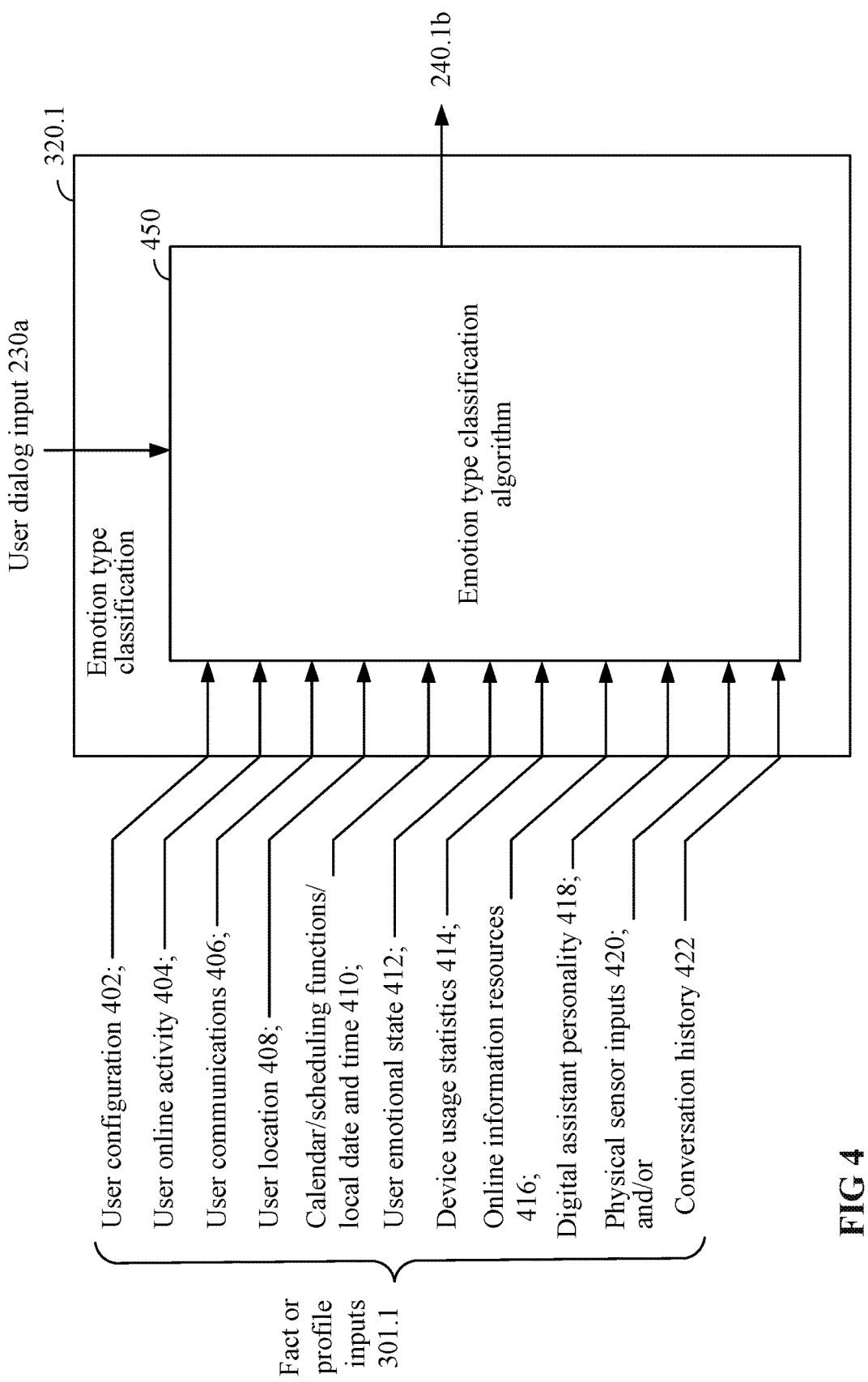
FIG. 4 illustrates an exemplary embodiment of an emotion type classification block according to the present disclosure.

FIG. 4 illustrates an exemplary embodiment 320.1 of an emotion type classification block according to the present disclosure. In FIG. 4, exemplary fact or profile inputs 301.1 obtainable by device 120 include a plurality of fact or profile parameters 402-422 selected by a system designer as relevant to the task of emotion type classification. Note exemplary fact or profile inputs 301.1 are given for illustrative purposes only. In alternative exemplary embodiments, any of the individual parameters of fact or profile inputs 301.1 may be omitted, and/or other parameters not shown in FIG. 4 may be added. The parameters 402-422 need not describe disjoint classes of parameters, i.e., a single type of input used by emotion type classification block 320.1 may simultaneously fall into two or more categories of the inputs 402-422. Such alternative exemplary embodiments are contemplated to be within the scope of the present disclosure.

User configuration 402 includes information directly input by user 110 to device 120 that aids in emotion type classification. In an exemplary embodiment, during set-up of device 120, or generally during operation of device 120, user 110 may be asked to answer a series of profile questions. For example, user 110 may be queried regarding age and gender, hobbies, interests, favorite movies, sports, personality traits, etc. In some instances, information regarding a user's personality traits (e.g., extrovert or introvert, dominant or submissive, etc.) may be inferred by asking questions from personality profile questionnaires. Information from user configuration 402 may be stored for later use by emotion type classification block 320.1 for selecting emotion type code 240.1*b*.

User online activity 404 includes Internet usage statistics and/or content of data transmitted to and from the Internet or other networks via device 120. In an exemplary embodiment, online activity 404 may include user search queries, e.g., as submitted to a Web search engine via device 120. The contents of user search queries may be noted, as well as other statistics such as frequency and/or timing of similar queries, etc. In an exemplary embodiment, online activity 404 may further include identities of frequently accessed websites, contents of e-mail messages, postings to social media websites, etc.

User communications 406 includes text or voice communications conducted using device 120. Such communications may include, e.g., text messages sent via short messaging service (SMS), voice calls over the wireless network, etc. User communications 406 may also include messaging on native or third-party social media networks, e.g., Internet websites accessed by user 110 using device 120, or instant messaging or chatting applications, etc.

User location 408 may include records of user location available to device 120, e.g., via wireless communications with one or more cellular base stations, or Internet-based location services, if such services are enabled. User location 408 may further specify a location context of the user, e.g., if the user is at home or at work, in a car, in a crowded environment, in a meeting, etc.

Calendar/scheduling functions/local date and time 410 may include time information as relevant to emotion classification based on the schedule of a user's activities. For example, such information may be premised on use of device 120 by user 110 as a personal scheduling organizer. In an exemplary embodiment, whether a time segment on a user's calendar is available or unavailable may be relevant to classification of emotion type. Furthermore, the nature of an upcoming appointment, e.g., a scheduled vacation or important business meeting, may also be relevant.

Calendar/scheduling functions/local date and time 410 may further incorporate information such as whether a certain time overlaps with working hours for the user, or whether the current date corresponds to a weekend, etc.

User emotional state 412 includes data related to determination of a user's real-time emotional state. Such data may include the content of the user's utterances to the dialog system, as well as voice parameters, physiological signals, etc. Emotion-recognition technology may further be utilized inferring a user's emotions by sensing, e.g., user speech, facial expression, recent text messages communicated to and from device 120, physiological signs including body temperature and heart rate, etc., as sensed by various sensors (e.g., physical sensor inputs 420) on device 120.

Device usage statistics 414 includes information concerning how frequently user 110 uses device 120, how long the user has used device 120, for what purposes, etc. In an exemplary embodiment, the times and frequency of user interactions with device 120 throughout the day may be recorded, as well as the applications used, or websites visited, during those interactions.

Online information resources 416 may include news or events related to a user's interests, as obtained from online information sources. For example, based on a determination that user 110 is a fan of a sports team, then online information resources 416 may include news that that sports team has recently won a game. Alternatively, if user 110 is determined to have a preference for a certain type of cuisine, for example, then online information resources 416 may include news that a new restaurant of that type has just opened near the user's home.

Digital assistant (DA) personality 418 may specify a personality profile for the dialog system, so that interaction with the dialog system by the user more closely mimics interaction with a human assistant. The DA personality profile may specify, e.g., whether the DA is an extrovert or introvert, dominant or submissive, or the gender of the DA. For example, DA personality 418 may specify a profile corresponding to a female, cheerful personality, for the digital assistant. Note this feature may be provided alternatively, or in conjunction with, system personality block 255 as described hereinabove with reference to FIG. 2.

Physical sensor inputs 420 may include signals derived from sensors on device 120 for sensing physical parameters of the device 120. For example, physical sensor inputs 420 may include sensor signals from accelerometers and/or gyroscopes in device 120, e.g., to determine if user 110 is currently walking or in a car, etc. Knowledge of a user's current mobility situation may provide information to emotion type classification block 320.1 aiding in generating an appropriate emotional response. Physical sensor inputs 420 may also include sensor signals from microphones or other acoustic recording devices on device 120, e.g., to infer characteristics of the environment based on the background noise, etc.

Conversation history 422 may include any records of present and past conversations between the user and the digital assistant.

Fact or profile inputs 301.1, along with user dialog input 230*a*, may be provided as input to emotion type classification algorithm 450 of emotion type classification block 320.1. Emotion type classification algorithm 450 may map the multi-dimensional vector specified by the specific fact or profile inputs 301.1 and user dialog input 230*a* to a specific output determination of emotion type code 240.1*b*, e.g., specifying an appropriate emotion type and corresponding degree of that emotion.

Figure 5:
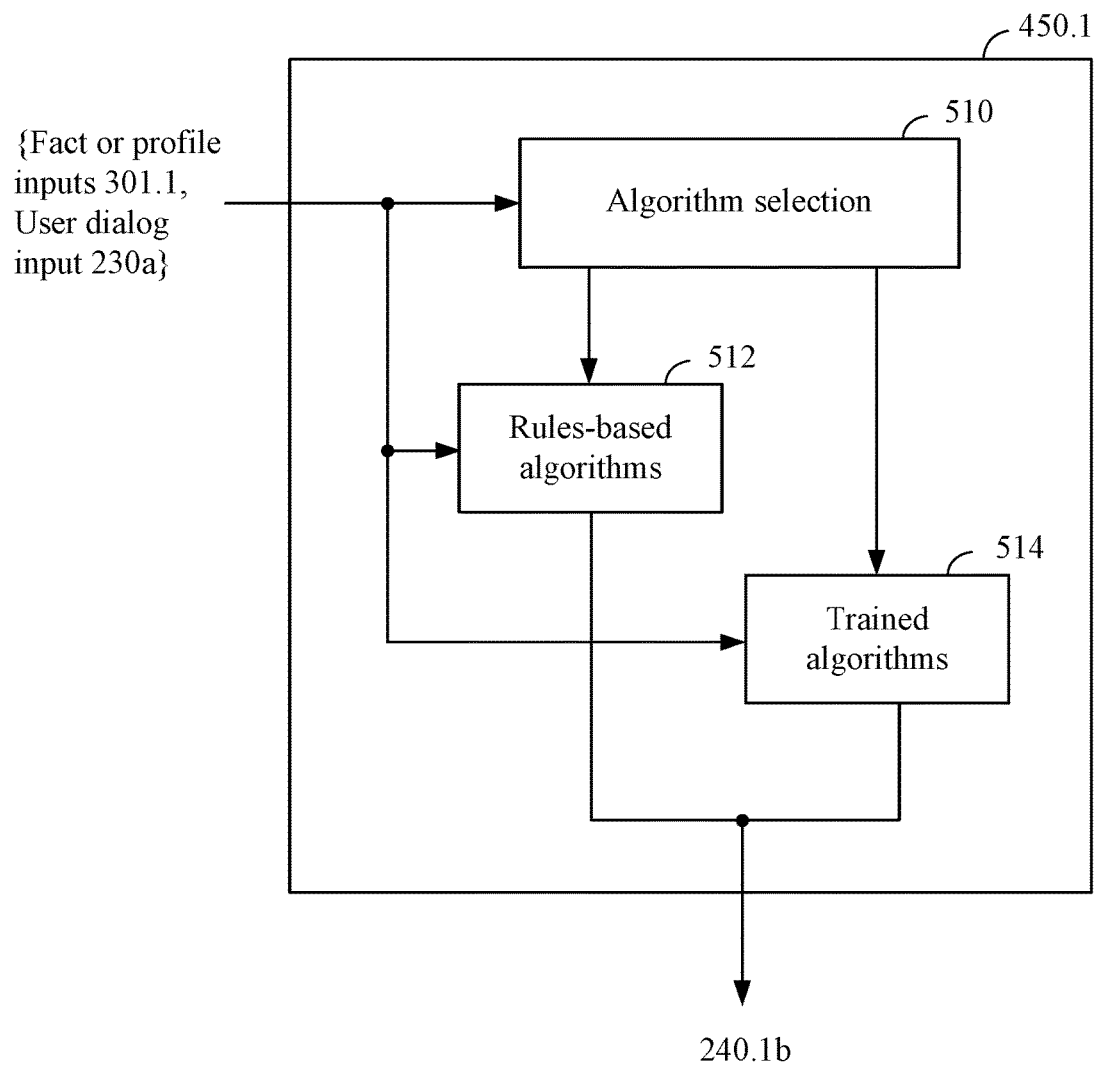
FIG. 5 illustrates an exemplary embodiment of a hybrid emotion type classification algorithm.

FIG. 5 illustrates an exemplary embodiment 450.1 of a hybrid emotion type classification algorithm. Note FIG. 5 is shown for illustrative purposes only, and is not meant to limit the scope of the present disclosure to any particular type of algorithm shown.

In FIG. 5, emotion type classification algorithm 450.1 includes algorithm selection block 510 for choosing at least one algorithm to be used for selecting emotion type. In an exemplary embodiment, the at least one algorithm includes rules-based algorithms 512 and trained algorithms 514. Rules-based algorithms 512 may correspond to algorithms specified by designers of the dialog system, and may generally be based on fundamental rationales as discerned by the designers for assigning a given emotion type to particular scenarios, facts, profiles, and/or user dialog inputs. Trained algorithms 514, on the other hand, may correspond to algorithms whose parameters and functional mappings are derived, e.g., offline, from large sets of training data. It will be appreciated that the inter-relationships between inputs and outputs in trained algorithms 514 may be less transparent to the system designer than in rules-based algorithms 512, and trained algorithms 514 may generally capture more intricate inter-dependencies amongst the variables as determined from algorithm training.

As seen in FIG. 5, both rules-based algorithms 512 and trained algorithms 514 may accept as inputs the fact or profile inputs 301.1 and user dialog input 230a. Algorithm selection block 510 may select an appropriate one of algorithms 512 or 514 to use for selecting emotion type code 240.1b in any instance. For example, in response to fact or profile inputs 301.1 and/or user dialog input 230a corresponding to a pre-determined set of values, selection block 510 may choose to implement a particular rules-based algorithm 512 instead of trained algorithm 514, or vice versa. In an exemplary embodiment, rules-based algorithms 512 may be preferred in certain cases over trained algorithms 514, e.g., if their design based on fundamental rationales may result in more accurate classification of emotion type in certain instances. Rules-based algorithms 512 may also be preferred in certain scenarios wherein, e.g., not enough training data is available to design a certain type of trained algorithm 514. In an exemplary embodiment, rules-based algorithms 512 may be chosen when it is relatively straightforward for a designer to derive an expected response based on a particular set of inputs.

Figure 6:
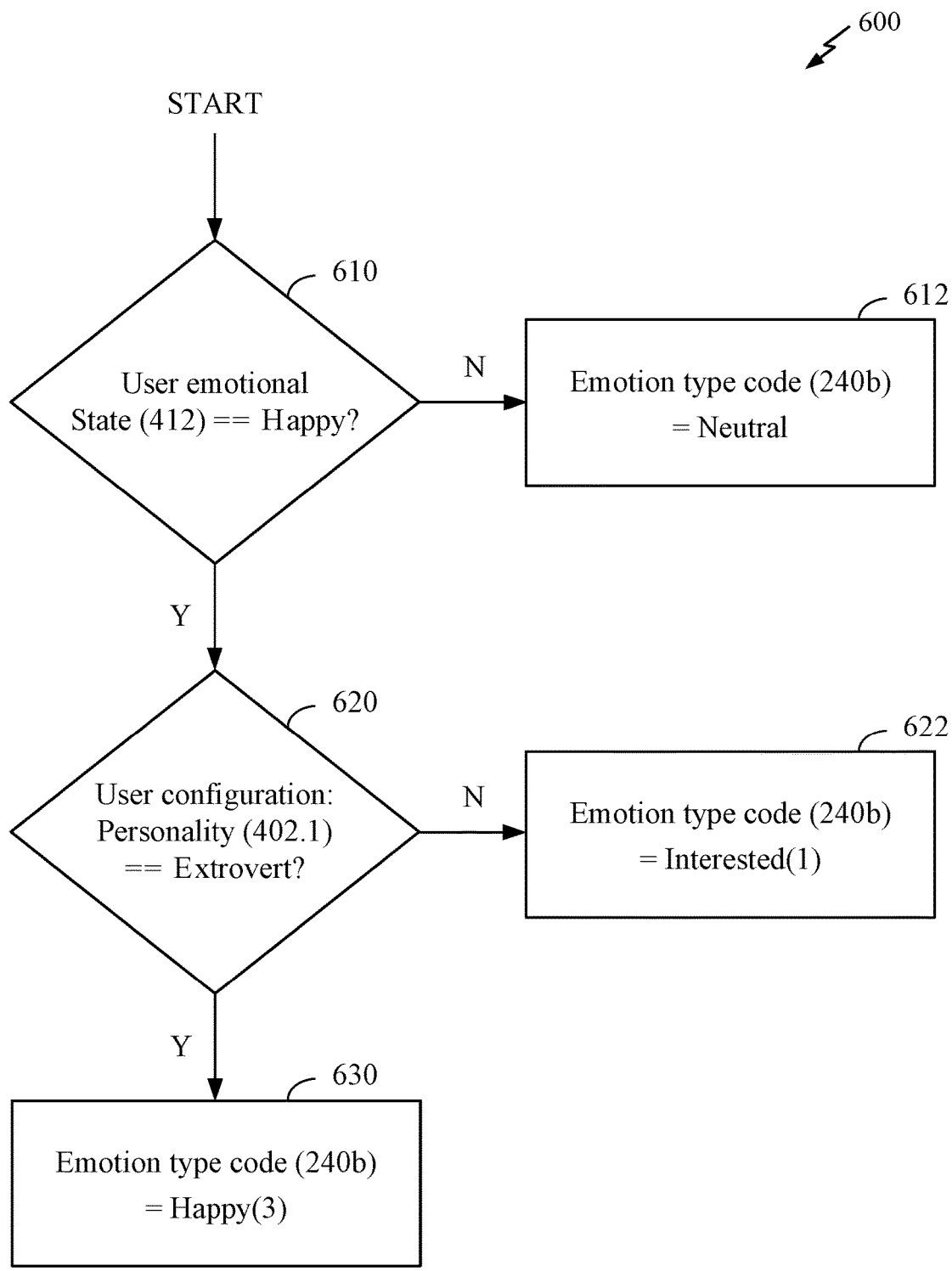
FIG. 6 illustrates an exemplary embodiment of a rules-based algorithm.

FIG. 6 illustrates an exemplary embodiment 600 of a rules-based algorithm. Note FIG. 6 is shown for illustrative purposes only, and is not meant to limit the scope of the present disclosure to rules-based algorithms, to any particular implementation of rules-based algorithms, or to any particular format or content for the fact or profile inputs 301.1 or emotion types 240b shown.

In FIG. 6, at decision block 610, it is determined whether user emotional state 412 is "Happy." If no, the algorithm proceeds to block 612, which sets emotion type code 240b to "Neutral." If yes, the algorithm proceeds to decision block 620.

At decision block 620, it is further determined whether a personality parameter 402.1 of user configuration 402 is "Extrovert." If no, then the algorithm proceeds to block 622, which sets emotion type code 240b to "Interested(1)," denoting an emotion type of "Interested" with degree of 1. If yes, the algorithm proceeds to block 630, which sets emotion type code 240b to "Happy(3)."

It will be appreciated that rules-based algorithm 600 selectively sets the emotion type code 240b based on user personality, under the assumption that an extroverted user will be more engaged by a dialog system exhibiting a more upbeat or "happier" emotion type. Rules-based algorithm 600 further sets emotion type code 240b based on current user emotional state, under the assumption that a currently happy user will respond more positively to a system having an emotion type that is also happy. In alternative exemplary embodiments, other rules-based algorithms not explicitly described herein may readily be designed to relate emotion type code 240b to other parameters and values of fact or profile inputs 301.1.

As illustrated by algorithm 600, the determination of emotion type code 240b need not always utilize all available parameters in fact or profile inputs 301.1 and user dialog input 230a. In particular, algorithm 600 utilizes only user emotional state 412 and user configuration 402. Such exemplary embodiments of algorithms utilizing any subset of available parameters, as well as alternative exemplary embodiments of algorithms utilizing parameters not explicitly described herein, are contemplated to be within the scope of the present disclosure.

Figure 7:
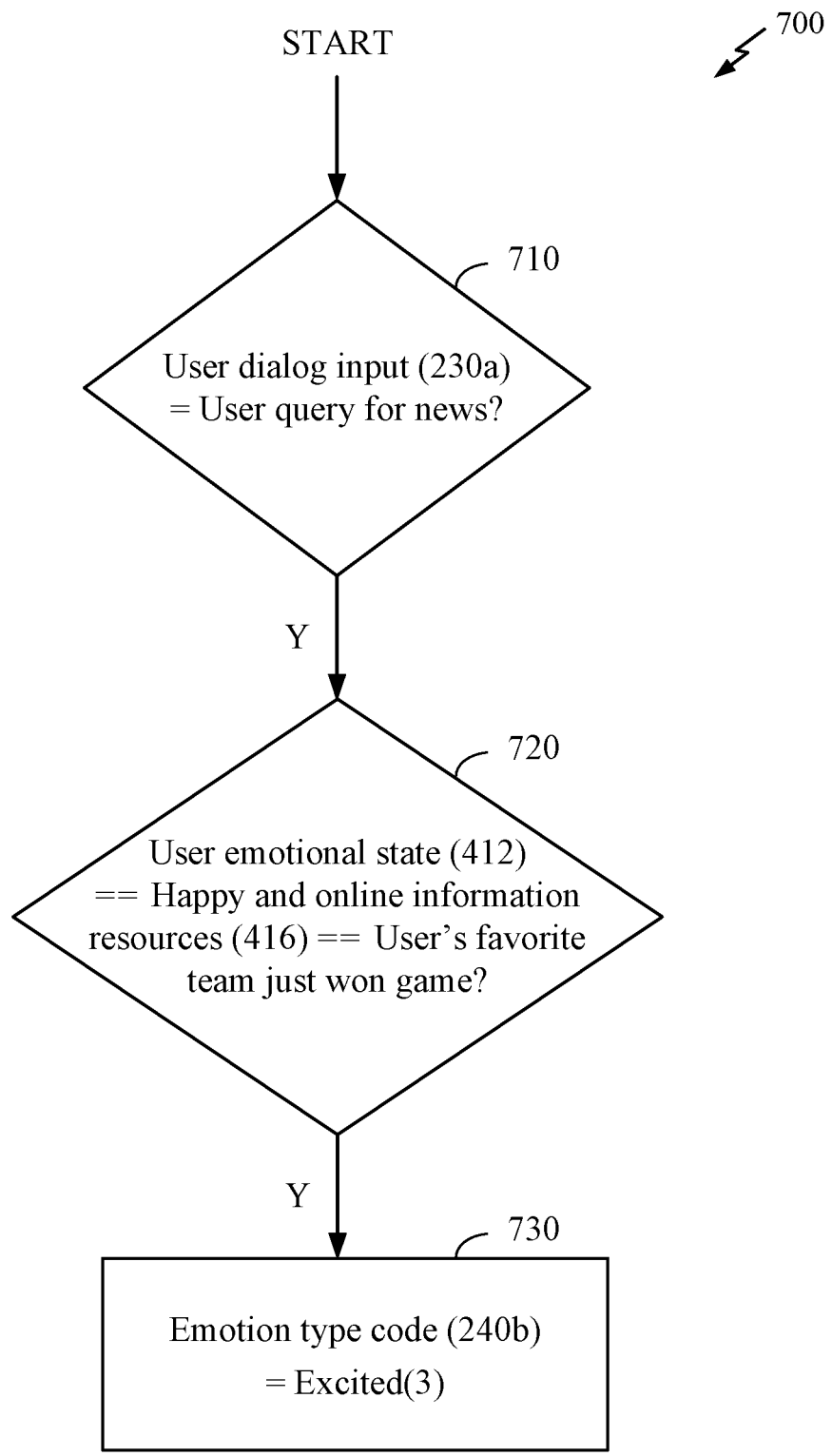
FIG. 7 illustrates an alternative exemplary embodiment of a rules-based algorithm.

FIG. 7 illustrates an alternative exemplary embodiment 700 of a rules-based algorithm. In FIG. 7, at decision block 710, it is determined whether user dialog input 230a corresponds to a query by the user for updated news. If yes, then the algorithm proceeds to decision block 720.

At decision block 720, it is determined whether user emotional state 412 is "Happy," and further whether online information resources 416 indicate that the user's favorite sports team has just won a game. In an exemplary embodiment, the user's favorite sports team may itself be derived from other parameters of fact or profile inputs 301.1, e.g., from user configuration 402, user online activity 404, calendar/scheduling functions 410, etc. If the output of decision block 720 is yes, then the algorithm proceeds to block 730, wherein emotion type code 240b is set to "Excited(3)."

Figure 8:
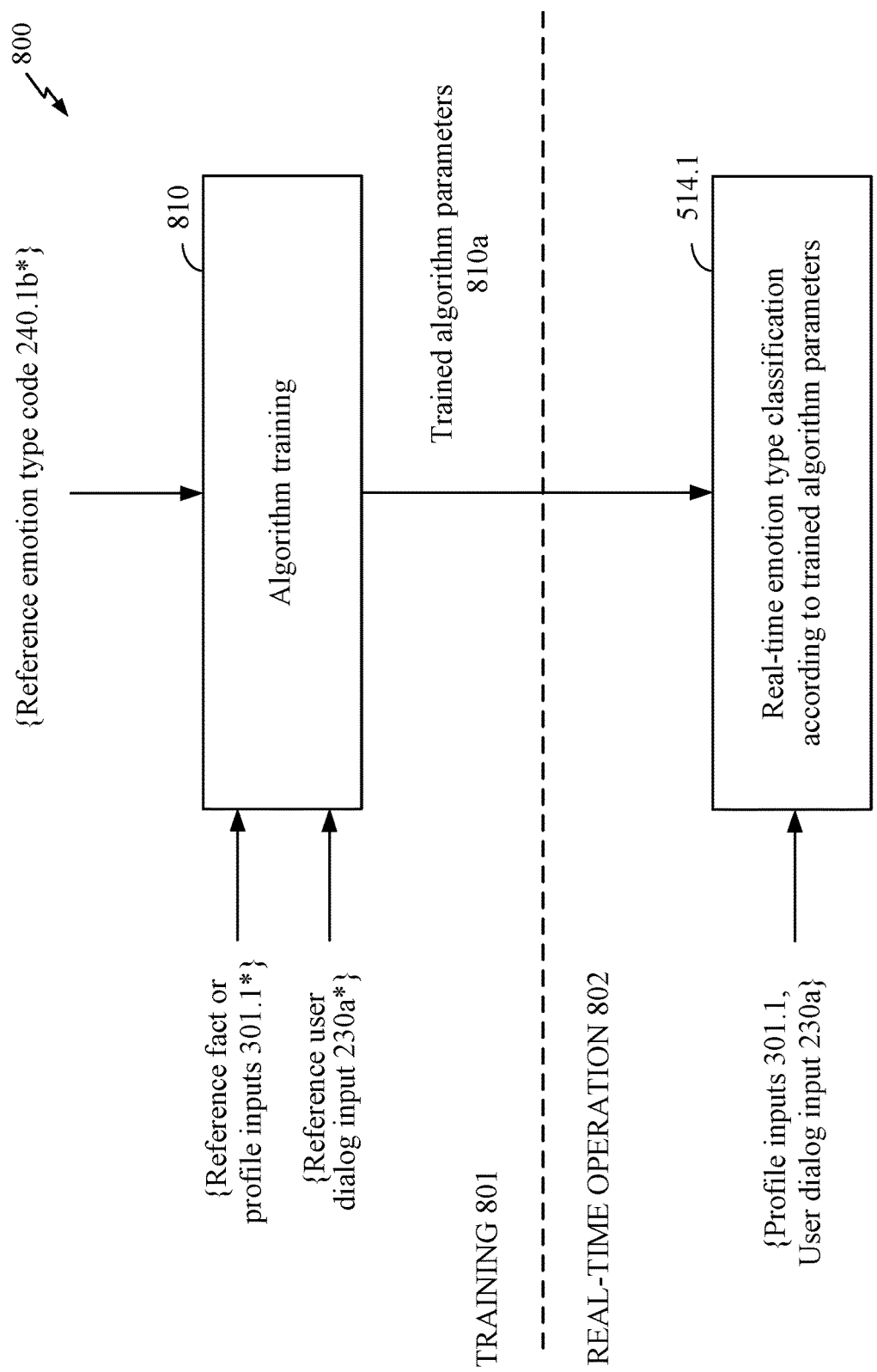
FIG. 8 illustrates an exemplary embodiment of a training scheme for deriving a trained algorithm for selecting emotion type.

In addition to rules-based algorithms for selecting emotion type code 240b, emotion type classification algorithm 450.1 may alternatively or in conjunction utilize trained algorithms FIG. 8 illustrates an exemplary embodiment 800 of a training scheme for deriving a trained algorithm for selecting emotion type. Note FIG. 8 is shown for illustrative purposes only, and is not meant to limit the scope of the present disclosure to any particular techniques for training algorithms for selecting emotion type.

In FIG. 8, during a training phase 801, an algorithm training block 810 is provided with inputs including a series or plurality of reference fact or profile inputs 301.1*, a corresponding series of reference previous user inputs 230a*, and a corresponding series of reference emotion type codes 240.1b*. Note a parameter x enclosed in braces {x} herein denotes a plurality or series of the objects x. In particular, each reference fact or profile input 301.1* corresponds to a specific combination of settings for fact or profile inputs 301.1.

For example, one exemplary reference fact or profile input 301.1* may specify user configuration 402 to include an "extroverted" personality type, user online activity 404 to include multiple instances of online searches for the phrase "Seahawks," user location 408 to correspond to "Seattle" as a city of residence, etc. Corresponding to this reference fact or profile input 301.1*, a reference user dialog input 230a* may include a user query regarding latest sports news. In an alternative instance, the reference user dialog input 230a* corresponding to this reference fact or profile input 301.1* may be a NULL string, indicating no previous user input. Based on this exemplary combination of reference fact or profile input 301.1* and corresponding reference user dialog input 230a*, a reference emotion type code 240.1b* may be specified to algorithm training block 810 during a training phase 801.

In an exemplary embodiment, the appropriate reference emotion type code 240.1b* for particular settings of reference fact or profile input 301.1* and user dialog input 230a* may be supplied by human annotators or judges. These human annotators may be presented with individual combinations of reference fact or profile inputs and reference user inputs during training phase 801, and may annotate each combination with a suitable emotion type responsive to the situation. This process may be repeated using many human annotators and many combinations of reference fact or profile inputs and previous user inputs, such that a large body of training data is available for algorithm training block 810. Based on the training data and reference emotion type annotations, an optimal set of trained algorithm parameters 810*a* may be derived for a trained algorithm that most accurately maps a given combination of reference inputs to a reference output.

In an exemplary embodiment, a human annotator may possess certain characteristics that are similar or identical to corresponding characteristics of a personality of a digital assistant. For example, a human annotator may have the same gender or personality type as the configured characteristics of the digital assistant as designated by, e.g., system personality 255 and/or digital assistant personality 418.

Algorithm training block 810 is configured to, in response to the multiple supplied instances of reference fact or profile input 301.1\*, user dialog input 230*a*\*, and reference emotion type code 240.1*b*\*, derive a set of algorithm parameters, e.g., weights, structures, coefficients, etc., that optimally map each combination of inputs to the supplied reference emotion type. In an exemplary embodiment, techniques may be utilized from machine learning, e.g., supervised learning, that optimally derive a general rule for mapping inputs to outputs. Algorithm training block 810 accordingly generates an optimal set of trained algorithm parameters 810*a*, which is provided to an exemplary embodiment 514.1 of trained algorithm block 514, such as shown in FIG. 5. In particular, block 514.1 selects emotion type 240.1*b* during real-time operation 802 according to trained algorithm parameters 810*a*.

Further provided hereinbelow is an illustrative description of an exemplary application of techniques of the present disclosure. Note the example is given for illustrative purposes only, and is not meant to limit the scope of the present disclosure to any particular sets or types of fact or profile inputs, system responses, or scenarios.

Mark is a football fan. He always pays attention to news about the National Football League (NFL). Being a resident of Seattle, his favorite team is the Seattle Seahawks. Every Sunday, Mark watches football games online using his smartphone, and discusses players and teams with his friends through online chatting applications. He also shares his activities and interest on social media applications. A few months ago, when the Seahawks beat the 49ers in overtime, he was very excited and discussed the win extensively on his social media profile page.

On a given Monday, the Seahawks are playing the 49ers in San Francisco on Monday Night Football. Unfortunately, Mark had a dinner with a client, and missed the game. The dinner was an important meeting for Mark, as he was about to close a business deal. It turned out that the meeting went very well, and Mark's proposal was accepted by the clients. After dinner, on Mark's drive home, he activated the interactive dialog system (or digital assistant DA) on his smartphone to engage in a real-time voice conversation.

Mark: "Hey, it was a great dinner! I sealed the deal. I think Don (Mark's boss) is going to love this."

Digital Assistant (in an upbeat tone of voice): "Excellent! Good to hear." (DA Response 1)

Mark: "So, what about those Seahawks? Tell me!"

Digital Assistant (in an excited tone of voice): "Guess what, your Seahawks won! They beat the 49ers 30 to 25. Russell Wilson threw two touchdown passes in the fourth quarter." (DA Response 2)

Mark: "Wow, that's great. I am sorry I missed this game. I think they will be in the playoffs again this year!"

Digital Assistant (continuing in an excited voice, slightly more subdued): "Yes! I should just block off your calendar during the playoffs. I don't think you'd want to miss that!" (DA Response 3)

The preceding example illustrates several aspects of techniques of the present disclosure. In particular, the interactive dialog system knows that Mark is a football fan, and also a Seahawks fan. It obtains this information from, e.g., explicit settings configured by Mark on his digital assistant, indicating that Mark wants to track football news, and also that his favorite team is the Seahawks. From online information sources, the DA is also aware that the Seahawks played that night against their rival team, the San Francisco 49ers, and that the Seahawks beat them from behind. This enables the DA to select an emotion type corresponding to an excited tone of voice (DA Response 2) when reporting news of the Seahawks' win to Mark. Furthermore, based on knowledge of Mark's preferences and his previous input, the DA selects an excited tone of voice when offering to block off time for Mark in his calendar (DA Response 3).

The dialog system further has information regarding Mark's personality, as derived from, e.g., Mark's usage pattern of his smartphone (e.g., frequency of usage, time of usage, etc.), personal interests and hobbies as indicated by Mark during set up of his smartphone, as well as status updates to his social media network. In this example, the dialog system may determine that Mark is an extrovert and a conscientious person based on machine learning algorithms designed to deal with a large number of statistics generated by Mark's usage pattern of his phone to infer Mark's personality.

Further information is derived from the fact that Mark activated the DA system over two months ago, and that he has since been using the DA regularly and with increasing frequency. In the last week, Mark interacted with the DA an average of 5 times per day. In an exemplary embodiment, certain emotion type classification algorithms may infer an increasing intimacy between Mark and the DA due to such frequency of interaction.

The DA further determines Mark's current emotional state to be happy from his voice. From his use of the calendar/scheduling function on the device, the DA knows that it is after working hours, and that Mark has just finished a meeting with his client. During the interaction, the DA identifies that Mark is in his car, e.g., from the establishment of a wireless Bluetooth connection with the car's electronics, intervals of being stationary following intervals of walking as determined by an accelerometer, the lower level of background noise inside a car, the measured velocity of movement, etc. Furthermore, from past data such as location data history matched to time-of-day statistics, etc., it is surmised that Mark is driving home after dinner. Accordingly, per a classification algorithm such as described with reference to block 450.1 in FIG. 4, the DA selects an emotion type corresponding to an upbeat tone of voice (DA Response 1).

Figure 9:
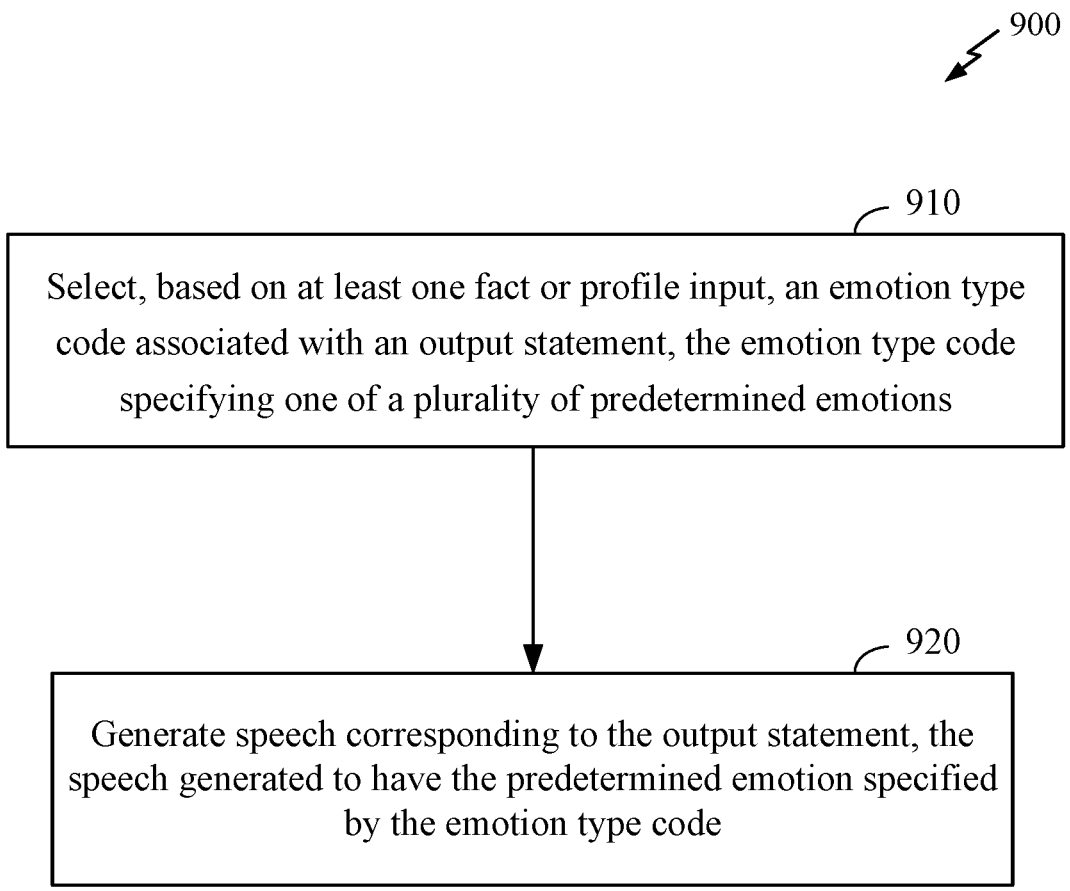
FIG. 9 illustrates an exemplary embodiment of a method according to the present disclosure.

FIG. 9 illustrates an exemplary embodiment of a method 900 according to the present disclosure. Note FIG. 9 is shown for illustrative purposes only, and is not meant to limit the scope of the present disclosure to any particular method shown.

In FIG. 9, at block 910, the method includes selecting, based on at least one fact or profile input, an emotion type code associated with an output statement, the emotion type code specifying one of a plurality of predetermined emotion types.

At block 920, the method includes generating speech corresponding to the output statement, the speech generated to have the predetermined emotion type specified by the emotion type code. In an exemplary embodiment, the at least one fact or profile input is derived from usage of a mobile communications device implementing an interactive dialog system.

Figure 10:
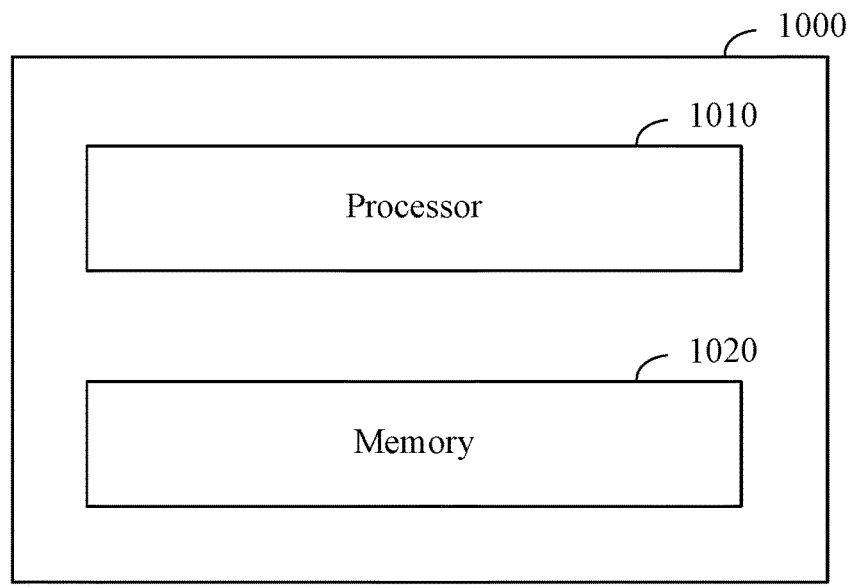
FIG. 10 schematically shows a non-limiting computing system that may perform one or more of the above described methods and processes.

FIG. 10 schematically shows a non-limiting computing system 1000 that may perform one or more of the above described methods and processes. Computing system 1000 is shown in simplified form. It is to be understood that virtually any computer architecture may be used without departing from the scope of this disclosure. In different embodiments, computing system 1000 may take the form of a mainframe computer, server computer, cloud computing system, desktop computer, laptop computer, tablet computer, home entertainment computer, network computing device, mobile computing device, mobile communication device, smartphone, gaming device, etc.

Computing system 1000 includes a processor 1010 and a memory 1020. Computing system 1000 may optionally include a display subsystem, communication subsystem, sensor subsystem, camera subsystem, and/or other components not shown in FIG. 10. Computing system 1000 may also optionally include user input devices such as keyboards, mice, game controllers, cameras, microphones, and/or touch screens, for example.

Processor 1010 may include one or more physical devices configured to execute one or more instructions. For example, the processor may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor may include one or more processors that are configured to execute software instructions. Additionally or alternatively, the processor may include one or more hardware or firmware logic machines configured to execute hardware or firmware instructions. Processors of the processor may be single core or multicore, and the programs executed thereon may be configured for parallel or distributed processing. The processor may optionally include individual components that are distributed throughout two or more devices, which may be remotely located and/or configured for coordinated processing. One or more aspects of the processor may be virtualized and executed by remotely accessible networked computing devices configured in a cloud computing configuration.

Memory 1020 may include one or more physical devices configured to hold data and/or instructions executable by the processor to implement the methods and processes described herein. When such methods and processes are implemented, the state of memory 1020 may be transformed (e.g., to hold different data).

Memory 1020 may include removable media and/or built-in devices. Memory 1020 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Memory 1020 may include devices with one or more of the following characteristics: volatile, nonvolatile, dynamic, static, read/write, read-only, random access, sequential access, location addressable, file addressable, and content addressable. In some embodiments, processor 1010 and memory 1020 may be integrated into one or more common devices, such as an application specific integrated circuit or a system on a chip.

Memory 1020 may also take the form of removable computer-readable storage media, which may be used to store and/or transfer data and/or instructions executable to implement the herein described methods and processes. Memory 1020 may take the form of CDs, DVDs, HD-DVDs, Blu-Ray Discs, EEPROMs, and/or floppy disks, among others.

It is to be appreciated that memory 1020 includes one or more physical devices that stores information. The terms "module," "program," and "engine" may be used to describe an aspect of computing system 1000 that is implemented to perform one or more particular functions. In some cases, such a module, program, or engine may be instantiated via processor 1010 executing instructions held by memory 1020. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

In an aspect, computing system 1000 may correspond to a computing device including a memory 1020 holding instructions executable by a processor 1010 to select, based on at least one fact or profile input, an emotion type code associated with an output statement, the emotion type code specifying one of a plurality of predetermined emotion types. The instructions are further executable by processor 1010 to generate speech corresponding to the output statement, the speech generated to have the predetermined emotion type specified by the emotion type code. In an exemplary embodiment, the at least one fact or profile input is derived from usage of a mobile communications device implementing an interactive dialog system. Note such a computing device will be understood to correspond to a process, machine, manufacture, or composition of matter.

Figure 11:
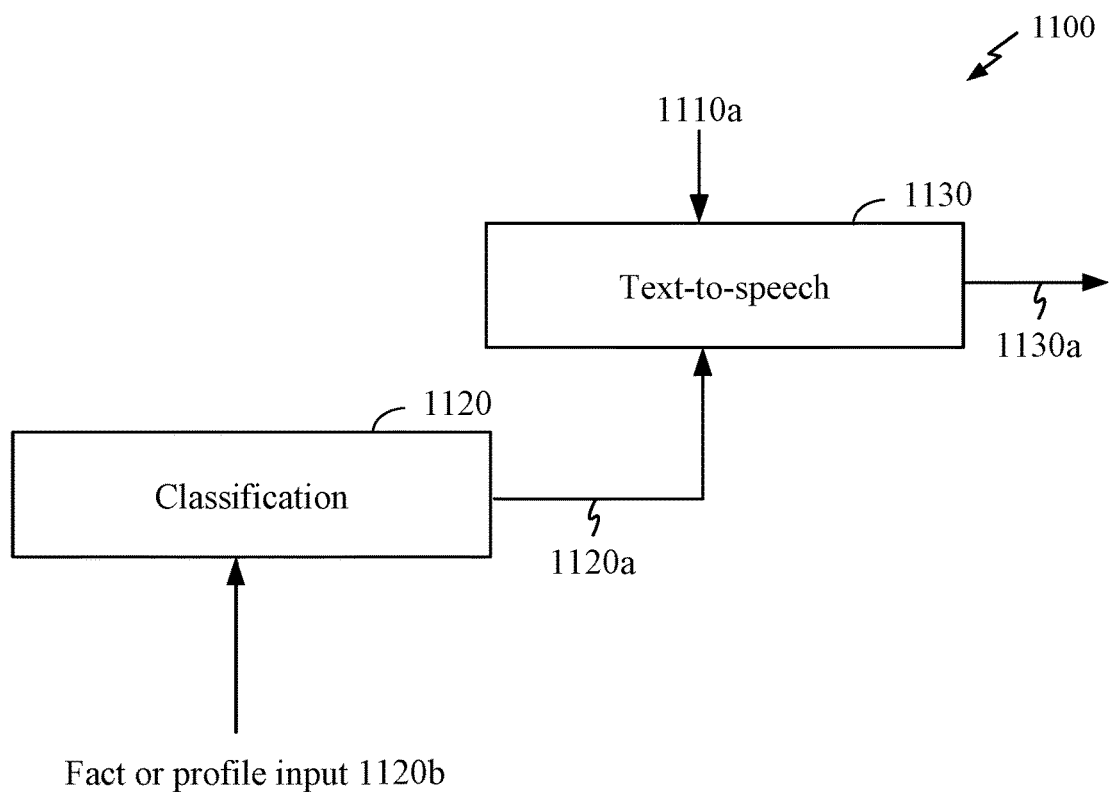
FIG. 11 illustrates an exemplary embodiment of an apparatus according to the present disclosure.

FIG. 11 illustrates an exemplary embodiment of an apparatus 1100 according to the present disclosure. Note the apparatus 1100 is shown for illustrative purposes only, and is not meant to limit the scope of the present disclosure to any particular apparatus shown.

In FIG. 11, a classification block 1120 is configured to select, based on at least one fact or profile input 1120b, an emotion type code 1120a associated with an output statement 1110a. The emotion type code 1120a specifies one of a plurality of predetermined emotion types. A text-to-speech block 1130 is configured to generate speech 1130a corresponding to the output statement 1110a and the predetermined emotion type specified by the emotion type code 1120a. In an exemplary embodiment, the at least one fact or profile input 1120b is derived from usage of a mobile communications device implementing the interactive dialog system.

Note techniques of the present disclosure need not be limited to embodiments incorporating a mobile communications device. In alternative exemplary embodiments, the present techniques may also be incorporated in non-mobile devices, e.g., desktop computers, home gaming systems, etc. Furthermore, mobile communications devices incorporating the present techniques need not be limited to smartphones, and may also include wearable devices such as computerized wristwatches, eyeglasses, etc. Such alternative exemplary embodiments are contemplated to be within the scope of the present disclosure.

Figure 12:
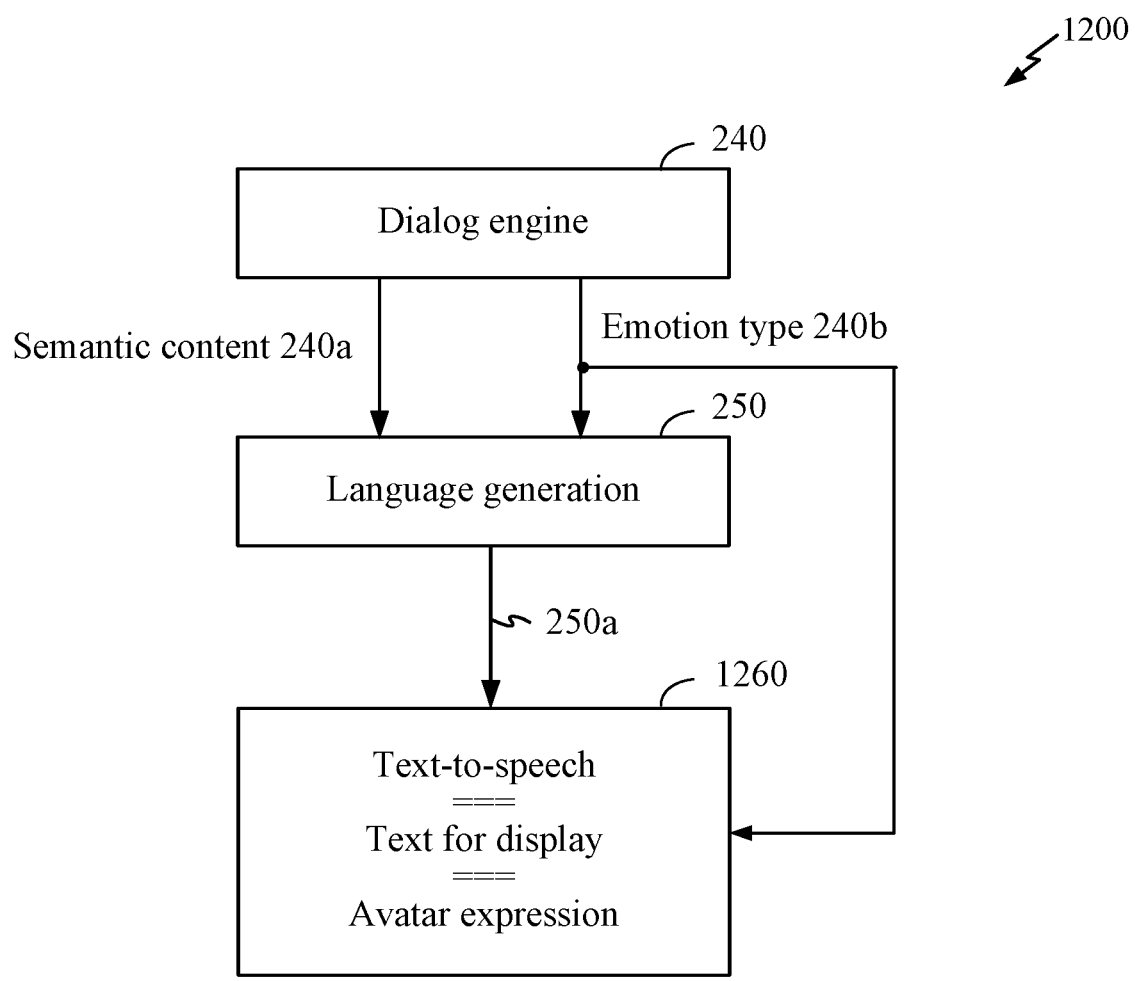
FIG. 12 illustrates an exemplary embodiment wherein techniques of the present disclosure are incorporated in a dialog system with emotional content imparted to displayed text, rather than or in addition to audible speech.

FIG. 12 illustrates an exemplary embodiment 1200 wherein techniques of the present disclosure are incorporated in a dialog system with emotional content imparted to displayed text, rather than or in addition to audible speech. Note blocks shown in FIG. 12 correspond to similarly labeled blocks in FIG. 2, and certain blocks shown in FIG. 2 are omitted from FIG. 12 for ease of illustration.

In FIG. 12, output 250a of language generation block 250 is combined with emotion type code 240b generated by dialog engine 240 and input to a text to speech and/or text for display block 1260. In a text to speech aspect, block 1260 generates speech with semantic content 240a and emotion type code 240b. In a text for display aspect, block 1260 alternatively or further generates text for display with semantic content 240a and emotion type code 240b. It will be appreciated that emotion type code 240b may impart emotion to displayed text using such techniques as, e.g., adjusting the size or font of displayed text characters, providing emoticons (e.g., smiley faces or other pictures) corresponding to the emotion type code 240b, etc. In an exemplary embodiment, block 1260 alternatively or further generates emotion-based animation or graphical modifications to one or more avatars representing the DA or user on a display. For example, if emotion type code 240b corresponds to "sadness," then a pre-selected avatar representing the DA may be generated with a pre-configured "sad" facial expression, or otherwise be animated to express sadness through motion, e.g., weeping actions. Such alternative exemplary embodiments are contemplated to be within the scope of the present disclosure.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. An apparatus for an interactive dialog system, the apparatus comprising:
   a semantic content generation block configured to generate an output statement informationally responsive to a user dialog input, the output statement comprising a computer-generated object to be displayed on a display device;
   a classification block configured to select, based on at least one fact or profile input, an emotion type code to be imparted to the computer-generated object, the emotion type code specifying one of a plurality of predetermined emotion types; and
   a visual generation block configured to generate a digital image representation of the computer-generated object, the digital image representation generated to have the predetermined emotion type specified by the emotion type code;
   wherein the at least one fact or profile input is derived from usage of a mobile communications device implementing the interactive dialog system; and further wherein the classification block is trained by providing a training block with a plurality of reference fact or profile inputs or previous user inputs derived from a training corpus.

2. The apparatus of claim 1, the digital image representation comprising displayed text having different font or text size depending on the predetermined emotion type specified by the emotion type code.

3. The apparatus of claim 1, the digital image representation comprising an emoticon having the predetermined emotion type specified by the emotion type code.

4. The apparatus of claim 1, the digital image representation comprising a digital avatar representing a digital assistant personality, the digital avatar having different graphical characteristics depending on the predetermined emotion type specified by the emotion type code.

5. The apparatus of claim 4, the digital avatar being generated with different animations depending on the predetermined emotion type specified by the emotion type code.

6. The apparatus of claim 1, the at least one fact or profile input comprising at least one user configuration parameter directly input by the user to the mobile communications device.

7. The apparatus of claim 1, the at least one fact or profile input further comprising at least one parameter derived from user online activity using the apparatus.

8. The apparatus of claim 7, the at least one parameter derived from user online activity comprising at least one of Internet search queries, accessed Internet websites, contents of e-mail messages, and postings to online social media websites.

9. The apparatus of claim 1, the at least one fact or profile input further comprising at least one of user location as determined by a position system of the mobile communications device, contents of user text or voice communications conducted using the mobile communications device, and at least one event scheduled by the user using a calendar scheduling function of the mobile communications device.

10. The apparatus of claim 1, the classification block further configured to select the emotion type code based on the user dialog input to the interactive dialog system, the interactive dialog system being executed by at least one processor of the mobile communications device.

11. A computing device including a processor and a memory holding instructions executable by the processor to:
   generate an output statement informationally responsive to a user dialog input, the output statement comprising a computer-generated object to be displayed on a display device;

select, based on at least one fact or profile input, an emotion type code to be imparted to the computer-generated object, the emotion type code specifying one of a plurality of predetermined emotion types; and generate a digital image representation of the computer-generated object, the digital image representation generated to have the predetermined emotion type specified by the emotion type code;

wherein the at least one fact or profile input is derived from usage of a mobile communications device implementing an interactive dialog system, and further wherein the classification block is trained by providing a training block with a plurality of reference fact or profile inputs or previous user inputs derived from a training corpus.

12. The computing device of claim 11, the digital image representation comprising displayed text having different font or text size depending on the predetermined emotion type specified by the emotion type code.

13. The computing device of claim 11, the digital image representation comprising a digital avatar representing a digital assistant personality, the digital avatar having different graphical characteristics depending on the predetermined emotion type specified by the emotion type code.

14. The computing device of claim 13, the digital avatar being generated with different animations depending on the predetermined emotion type specified by the emotion type code.

15. The computing device of claim 11, the computing device comprising a smartphone configured to provide voice calling and Internet access services.

16. The computing device of claim 14, the at least one fact or profile input further comprising at least one of a parameter derived from user online activity using the smartphone, user location, contents of user text or voice communications, and at least one event scheduled by the user using a calendar scheduling function of the device.

17. A method comprising:

generating an output statement informationally responsive to a user dialog input, the output statement comprising a computer-generated object to be displayed on a display device;

selecting, based on at least one fact or profile input, an emotion type code to be imparted to the computer-generated object, the emotion type code specifying one of a plurality of predetermined emotion types; and generating a digital image representation of the computer-generated object, the digital image representation generated to have the predetermined emotion type specified by the emotion type code;

wherein the at least one fact or profile input is derived from usage of a mobile communications device implementing an interactive dialog system, and further wherein the classification block is trained by providing a training block with a plurality of reference fact or profile inputs or previous user inputs derived from a training corpus.

18. The method of claim 17, the digital image representation comprising displayed text having different font or text size depending on the predetermined emotion type specified by the emotion type code.

19. The method of claim 17, the digital image representation comprising an emoticon having the predetermined emotion type specified by the emotion type code.

20. The method of claim 17, the digital image representation comprising a digital avatar representing a digital assistant personality, the digital avatar having different graphical characteristics depending on the predetermined emotion type specified by the emotion type code.

21. The computing device of claim 11, the digital image representation comprising an emoticon having the predetermined emotion type specified by the emotion type code.

* * * * *